Dec. 26, 1944.  J. I. HAASE  2,365,815
METHOD OF BUILDING PNEUMATIC TIRES
Filed April 8, 1942
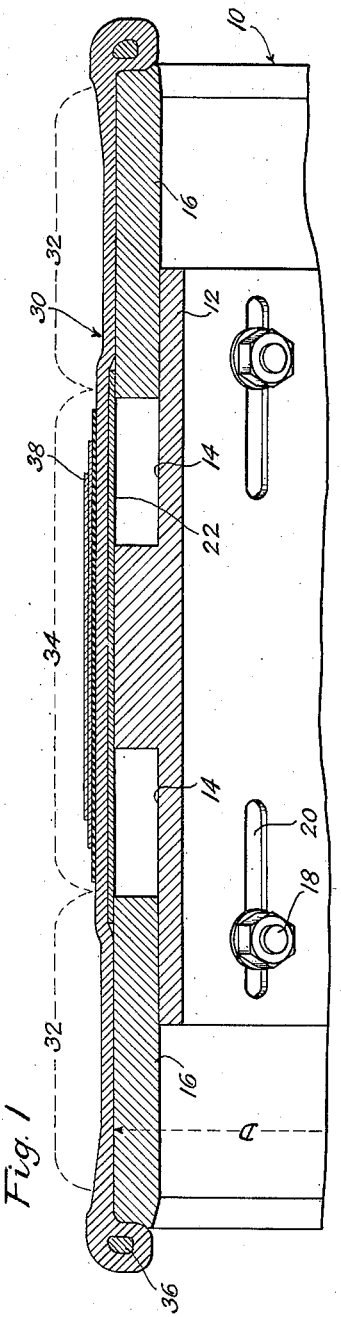
Inventor
Jorgen I. Haase
By
Attorney Patented Dec. 26, 1944

2,365,815

UNITED STATES PATENT OFFICE 2,365,815

METHOD OF BUILDING PNEUMATIC TIRES

Jorgen I. Haase, Akron, Ohio, assignor to Wingfoot Corporation, Akron, Ohio, a corporation of Delaware Application April 8, 1942, Serial No. 438,155

10 Claims. (Cl. 154—14)

This invention relates to methods for building pneumatic tires, and, more particularly, is concerned with improved methods for building pneumatic tires in substantially flat pulley form, and with method steps for facilitating the application of a combined tread and sidewall unit to the pulley carcass.

Heretofore, it has been the standard practice to build pneumatic tires upon a flat, or substantially flat, building drum, with the carcass as built being substantially cylindrical in form. Thereafter, and while still supported on the building form, the breaker assembly is secured on the tread portion of the carcass and the tread and sidewalls of the tire are positioned around the carcass and stitched tightly thereto. The complete unvulcanized tire in pulley form is then positioned within a mechanical, a fluid pressure, or a vacuum shaper and by differential pressure is forced out to toroidal or tire shape. The inextensible beads of the tire do not increase in diameter but the tread and sidewall portions of the tire do increase in diameter during the shaping operation, which change in diameter is accomplished by the pantographing of the cords in the several rubberized plies which form the tire carcass.

One difficulty which has always characterized the building operation generally described in the preceding paragraph, has been that when the carcass is built on a flat drum the overall diameter of the carcass with the breaker assembly thereon is greater at the tread portion of the carcass than the overall diameter adjacent the sidewalls of the carcass. As a result, when the tread and sidewalls are applied to the pulley carcass, there has been considerable buckling, wrinkling, or puckering of the sidewalls, or an undue stretching of the tread in order to uniformly cover the pulley carcass. This has been due to the fact that it is very convenient to extrude, calender or otherwise form the tread and sidewalls of the tire in a single unitary piece which is cut to proper length and applied around the circumference of the pulley carcass. It will be seen that when the combined tread and sidewall unit is cut to a length so that the tread portion of the unit will be the exact length to properly cover the tread portion of the pulley carcass, the sidewalls of the unit will be too long and will give the puckering and wrinkling action described when they are stitched down against the sidewalls of the pulley carcass. These puckers or wrinkles in the sidewalls of the tire may cause air pockets during vulcanization and are very undesirable. Or, if the sidewalls are cut to proper length in the combined tread and sidewall unit, then the tread portion of the unit will have to be considerably stretched when applied to the pulley carcass, and this stretching is a comparatively difficult and tedious procedure for the tire builder.

It is the general object of my invention to avoid and overcome the foregoing and other difficulties encountered in the building of a pneumatic tire by the provision of an improved tire building method which facilitates the application of a combined tread and sidewall unit to a flat, or substantially flat, pulley carcass without wrinkling, puckering, or stretching of any of the portions of the combined tread and sidewall unit.

Another object of my invention is the provision of a tire building method which includes the steps of building a ply carcass of pulley band shape having sidewall portions of an external diameter greater than the external diameter of the tread portion of the carcass, and applying a combined tread and sidewall unit without stretching or puckering.

Another object of my invention is the provision of an improved method for building pneumatic tires by the flat band process and including stretching the sidewall portions of the substantially flat ply carcass to increase their circumferential length prior to applying a combined tread and sidewall unit thereto.

Another object of my invention resides in a method of building pneumatic tires which comprises shrinking the tread portion of a pulley carcass so as to decrease its circumferential length prior to applying a combined tread and sidewall unit thereto.

For a better understanding of my invention, reference should be had to the accompanying drawing, wherein Fig. 1 is a fragmentary longitudinal cross-sectional view of a tire building drum and pulley carcass without the tread and sidewall unit applied thereto; and Fig. 2 is a view similar to Fig. 1 and illustrating a type of building drum employed in the practice of part or all of the method of my invention, and indicating the position of application of the combined tread and sidewall unit thereto.

In the drawing, the numeral 10 indicates generally a tire building drum employed in the first part of the preferred embodiment of the method of my invention. The drum 10 includes a central portion 12 having channeled shoulders 14 which are adapted to slidably receive rings 16 which are secured adjustably in position by bolt means 18 carried by the rings 16 and slidably received in slots 20. Thus, the rings 16 can be adjusted laterally after appropriately loosening, and after adjustment, tightening the bolt means 18 so as to provide a drum 10 of desired width for a given tire building operation. The center portion of the drum 12 carries a thin band of metal 22 which extends over the inner ends of the rings 16 so as to provide a substantially flat building surface for the drum 10 regardless of the position of the side rings 16.

The flat pulley carcass 30 built on the drum 10 includes sidewall portions disposed substantially in zones 32, a tread portion extending through the width of zone 34, and beads 36. The carcass 30 is made up of a plurality of rubberized cord plies in a manner that will be well understood by those skilled in the art. Associated with the tread portion at 34 of the ply carcass 30 is a breaker assembly 38. This breaker assembly is usually built on and incorporated with the center of the ply carcass in the known and preferred manner usually followed in the building of tires.

After the pulley or ply carcass 30 has been built on the drum 10 to the form illustrated and in the well-known and standard manner generally described above, the drum 10 is collapsed so as to decrease its external circumference, and the drum 10 can be of any of the various well-known collapsing types, and the ply carcass is then positioned on the drum illustrated in Fig. 2 of the drawing and indicated generally by the numeral 50. This drum includes a central portion 52 having channeled extensions 54 which slidably receive side rings 56 which are adjustably secured to the central portion 52 by bolt means 58 slidably received in slots 60. Filler rings 62 of appropriate width are provided between the side rings 56 and the center portion 52 of the drum 50. The drum 50 is characterized by having a diameter adjacent the bead portions of the pulley or ply carcass which is equal to the diameter of the building drum 10. Thus, in the drawing, the letter D has been employed to indicate that the diameter of the drum 10 is equal to the diameter of the drum 50 immediately adjacent the beads of the pulley or ply carcass. However, the diameter of the drum 50 adjacent the sidewall portions of the pulley carcass is equal to the dimension D+ (somewhat greater than the diameter D) as indicated in the drawing and the dimension of the drum 50 adjacent the tread portion of the pulley carcass is equal to the dimension D— (somewhat less than the diameter D), as likewise illustrated in the drawing.

The drum 50 is of any suitable collapsible type and after the pulley carcass 30 is positioned on the collapsed drum, the drum is expanded to position the pulley carcass on the drum 50 in the manner shown in Fig. 2 of the drawing. During the expanding of the drum 50 the sidewall portions of the pulley carcass 30 are expanded to somewhat increase their circumferential length. The tread portion of the pulley carcass is, however, not expanded by the tread portion of the drum 50, but this portion of the drum merely supports the tread portion of the pulley carcass on the reduced diameter D' of the drum. The tread portion of the pulley carcass 30 does not pucker or wrinkle on the drum 50, nor is it loose thereon, for the reason that when the pulley carcass 30 is removed from the drum 10 the whole carcass tends to shrink or reduce itself in diameter and circumference because of the resiliency in the plies of the carcass.

Accordingly, the pulley carcass 30 positioned on the drum 50 with the drum fully expanded takes the position shown in Fig. 2 of the drawing at which time the tread portion of the carcass 30 is of less circumference than the sidewall portion of the carcass. This facilitates the application of a combined tread and sidewall unit thereto. Such a combined unit has been indicated by the numeral 70 in the drawing. The combined unit 70 may be cut to length and positioned around the pulley carcass 30 and stitched down into position without stretching the tread portion or wrinkling or puckering the sidewall portions of the unit for the reason that the median diameter of the tread portion of the unit, indicated by $D^t$, is substantially equal to the median diameter $D^s$ of the sidewall portions of the unit.

Although the preferred manner of practicing the method of my invention includes the several steps described, and the use of two different types of building drums, nevertheless, many of the features of my invention may be retained while employing only certain of the features of my method. For example, I may dispense with the building drum 10 and build the pulley carcass 30 directly upon the drum 50, with the tread and sidewall unit being applied to the pulley carcass in the manner already described. Again, I may merely increase the circumferential length of the sidewall portions of the carcass 30 prior to applying the tread and sidewall unit without decreasing the circumferential length of the tread portions of the carcass 30 prior to applying the tread and sidewall unit of the tread portion of the carcass. Or, alternatively, I may decrease the circumferential length of the tread portion of the pulley carcass without increasing the circumferential length of the sidewall portions of the carcass.

From the foregoing, it will be recognized that the various objects of my invention have been achieved by the provision of a relatively simple, improved process for building pneumatic tires and for facilitating the application of a tread and sidewall unit thereto without stretching, puckering, wrinkling, or the like. This result of my improved process contributes directly and importantly to the improvement of the tire constructed. Tread and/or sidewall separations from the carcass of the tire are reduced and the life and wearing qaulities of the tire are enhanced.

While, in accordance with patent statutes, I have specifically illustrated and described my advance in the art, it should be particularly understood that I am not to be limited thereto or thereby, but that the scope of my invention is defined in the appended claims.

I claim:

1. That method of building a pneumatic tire which includes the steps of building the ply carcass and breaker strips in substantially flat pulley band shape so that the internal diameter of the carcass is substantially the same between the beads of the carcass, slightly increasing the internal diameter of the sidewall portions of the carcass and slightly decreasing the internal diameter of the tread portion of the carcass while still in pulley band form, supporting the carcass in its new shape, and applying a combined tread and sidewall unit to the outer periphery of the supported carcass, the increase in diameter of the sidewall portion and the decrease in the diameter of the tread portion of the carcass being such that the median diameter of the applied tread is substantially equal to the median diameter of the applied sidewalls when the carcass is still supported.

2. That method of building a pneumatic tire which includes the steps of building the ply carcass in substantially flat pulley band shape so that the internal diameter of the carcass is substantially the same between the beads of the carcass, increasing the internal diameter of the sidewall portions of the carcass and decreasing the internal diameter of the tread portion of the carcass while still in pulley band form, supporting the carcass in its new shape, and applying a combined tread and sidewall unit to the outer periphery of the supported carcass.

3. That method of building a pneumatic tire which includes the steps of building the ply carcass and breaker strips in substantially flat pulley band shape so that the internal diameter of the carcass is substantially the same between the beads of the carcass, increasing the internal diameter of the sidewall portions of the carcass while still in pulley band form, supporting the carcass in its new shape, and applying a combined tread and sidewall unit to the outer periphery of the supported carcass, the increase in diameter of the sidewall portion of the carcass being such that the median diameter of the applied tread is substantially equal to the median diameter of the applied sidewalls when the carcass is still supported.

4. That method of building a pneumatic tire which includes the steps of building the ply carcass in substantially flat pulley band shape so that the internal diameter of the carcass is substantially the same between the beads of the carcass, increasing the internal diameter of the sidewall portions of the carcass while still in pulley band form, supporting the carcass in its new shape, and applying a combined tread and sidewall unit to the outer periphery of the supported carcass.

5. That method of building a pneumatic tire which includes the steps of building the ply carcass and breaker strips in substantially flat pulley band shape so that the internal diameter of the carcass is substantially the same between the beads of the carcass, decreasing the internal diameter of the tread portion of the carcass while still in pulley band form, supporting the carcass in its new shape, and applying a combined tread and sidewall unit to the outer periphery of the supported carcass, the decrease in the diameter of the tread portion of the carcass being such that the median diameter of the applied tread is substantially equal to the median diameter of the applied sidewall when the carcass is still supported.

6. That method of building a pneumatic tire which includes the steps of building the ply carcass in substantially flat pulley band shape so that the internal diameter of the carcass is substantially the same between the beads of the carcass, decreasing the internal diameter of the tread portion of the carcass only while still in pulley band form, supporting the carcass in its new shape, and applying a combined tread and sidewall unit to the outer periphery of the supported carcass.

7. That method of building a pneumatic tire which includes the steps of building the ply carcass in pulley band form, applying tread and sidewall portions of rubber to the carcass the tread portion having greater thickness than the sidewall portions, and rigidly supporting the carcass annularly during the applying operation so that the median diameter of the tread after it is applied and while the carcass is still supported is substantially equal to the median diameter of the sidewalls after they are applied and the carcass is still supported.

8. The series of method steps called for in claim 1 in which the internal diameter of the carcass is maintained constant immediately adjacent the beads during the entire building operation.

9. That method of building a pneumatic tire which includes the steps of providing a ply carcass of substantially flat pulley band form, contracting the tread portion of the carcass and rigidly supporting it annularly in such contracted condition, and applying unvulcanized rubber tread stock to the exterior of the carcass while it is so supported.

10. That method of building a pneumatic tire which includes the steps of providing a pulley-band ply carcass with a central tread portion of less diameter than its sidewall portions, providing appropriately compounded tread and sidewall material for application to the exterior of said carcass, and applying said tread and sidewall material to the carcass while rigidly supporting the carcass annularly.

JORGEN I. HAASE.